(12) United States Patent
Reuter et al.

(10) Patent No.: US 7,720,928 B2
(45) Date of Patent: *May 18, 2010

(54) CENTRALIZED FINE-GRAINED ENHANCEMENTS FOR DISTRIBUTED TABLE DRIVEN I/O MAPPING

(75) Inventors: James M. Reuter, Colorado Springs, CO (US); David W. Thiel, Colorado Springs, CO (US); Richard P. Helliwell, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2266 days.

This patent is subject to a terminal disclaimer.

(21) Appl. No.: 09/872,962

(22) Filed: Jun. 1, 2001

(65) Prior Publication Data

US 2002/0029326 A1 Mar. 7, 2002

Related U.S. Application Data

(60) Provisional application No. 60/209,109, filed on Jun. 2, 2000, provisional application No. 60/209,326, filed on Jun. 2, 2000.

(51) Int. Cl.
*G06F 15/167* (2006.01)
*G06F 12/00* (2006.01)
*G06F 13/00* (2006.01)
*G06F 13/28* (2006.01)
*G06F 9/26* (2006.01)
*G06F 9/34* (2006.01)

(52) U.S. Cl. .................. 709/213; 711/203; 711/114

(58) Field of Classification Search ............. 709/200, 709/202–217, 219–230, 245–249; 711/152, 711/170, 112, 162, 102–104, 202–209, 111, 711/114, 148; 707/20; 714/5; 710/20
See application file for complete search history.

(56) References Cited

U.S. PATENT DOCUMENTS

| | | | | | |
|---|---|---|---|---|---|
| 5,124,987 | A | * | 6/1992 | Milligan et al. | 714/7 |
| 5,404,478 | A | * | 4/1995 | Arai et al. | 711/206 |
| 5,483,649 | A | * | 1/1996 | Kuznetsov et al. | 726/22 |
| 5,634,111 | A | * | 5/1997 | Oeda et al. | 711/153 |
| 5,689,678 | A | * | 11/1997 | Stallmo et al. | 711/114 |
| 5,805,835 | A | * | 9/1998 | Jeddeloh et al. | 710/107 |
| 5,890,189 | A | * | 3/1999 | Nozue et al. | 711/100 |

(Continued)

OTHER PUBLICATIONS

Montague, Robert M. et al., Virtualizing The SAN, Morgan Keegan & Company, Inc., Jul. 5, 2000, pp. 1-20.

*Primary Examiner*—Asad M Nawaz

(57) ABSTRACT

A virtual storage system comprises an agent to store a first table to map virtual storage segments to storage locations, and a controller to store a second table and to intermittently cause contents of the first table to be replaced by contents of the second table. During an I/O operation, one of the entries in the first table can be accessed by a host to determine one of the storage locations. Also, a method for performing an I/O operation on a virtual storage segment, defined by first table that maps a storage segment to a first storage location, comprises turning off I/O operations at the first storage location, identifying portions of the virtual storage segment to be effected during a write operation, storing a record of identified portions at a second table not the first table, and writing to portions of the second storage location associated with the identified portions.

16 Claims, 11 Drawing Sheets

U.S. PATENT DOCUMENTS

| | | | | |
|---|---|---|---|---|
| 5,940,850 | A * | 8/1999 | Harish et al. | 711/102 |
| 5,941,972 | A * | 8/1999 | Hoese et al. | 710/315 |
| 6,023,281 | A * | 2/2000 | Grigor et al. | 345/543 |
| 6,038,639 | A * | 3/2000 | O'Brien et al. | 711/114 |
| 6,119,121 | A * | 9/2000 | Zhu | 707/101 |
| 6,212,531 | B1 * | 4/2001 | Blea et al. | 707/204 |
| 6,260,120 | B1 * | 7/2001 | Blumenau et al. | 711/152 |
| 6,269,431 | B1 * | 7/2001 | Dunham | 711/162 |
| 6,292,874 | B1 * | 9/2001 | Barnett | 711/153 |
| 6,324,627 | B1 * | 11/2001 | Kricheff et al. | 711/163 |
| 6,343,324 | B1 * | 1/2002 | Hubis et al. | 709/229 |
| 6,347,352 | B1 * | 2/2002 | Jeddeloh et al. | 710/243 |
| 6,353,878 | B1 * | 3/2002 | Dunham | 711/162 |
| 6,385,706 | B1 * | 5/2002 | Ofek et al. | 711/162 |
| 6,393,545 | B1 * | 5/2002 | Long et al. | 712/34 |
| 6,421,767 | B1 * | 7/2002 | Milillo et al. | 711/162 |
| 6,434,597 | B1 * | 8/2002 | Hachiya et al. | 709/202 |
| 6,493,811 | B1 * | 12/2002 | Blades et al. | 711/203 |
| 6,529,995 | B1 * | 3/2003 | Shepherd | 711/114 |
| 6,535,907 | B1 * | 3/2003 | Hachiya et al. | 709/202 |
| 6,538,669 | B1 * | 3/2003 | Lagueux et al. | 345/764 |
| 6,560,236 | B1 * | 5/2003 | Varghese et al. | 370/401 |
| 6,618,798 | B1 * | 9/2003 | Burton et al. | 711/202 |
| 6,643,748 | B1 * | 11/2003 | Wieland | 711/152 |
| 6,647,387 | B1 * | 11/2003 | McKean et al. | 707/9 |
| 6,671,776 | B1 * | 12/2003 | DeKoning | 711/114 |
| 6,684,209 | B1 * | 1/2004 | Ito et al. | 707/9 |
| 6,718,404 | B2 * | 4/2004 | Reuter et al. | 710/20 |
| 6,742,090 | B2 * | 5/2004 | Sanada et al. | 711/152 |
| 6,745,207 | B2 * | 6/2004 | Reuter et al. | 707/200 |
| 6,772,231 | B2 * | 8/2004 | Reuter et al. | 710/8 |
| 6,775,790 | B2 * | 8/2004 | Reuter et al. | 714/5 |
| 6,845,428 | B1 * | 1/2005 | Kedem | 711/117 |
| 6,975,581 | B1 * | 12/2005 | Medina et al. | 370/401 |
| 7,027,773 | B1 * | 4/2006 | McMillin | 455/41.2 |
| 7,162,598 | B2 * | 1/2007 | Watanabe et al. | 711/162 |
| 7,269,631 | B2 * | 9/2007 | Reuter et al. | 709/216 |
| 7,447,939 | B1 * | 11/2008 | Faulkner et al. | 714/8 |
| 7,573,882 | B2 * | 8/2009 | Medina et al. | 370/392 |
| 2002/0019923 | A1 * | 2/2002 | Reuter et al. | 711/206 |
| 2002/0026558 | A1 * | 2/2002 | Reuter et al. | 711/114 |
| 2002/0029326 | A1 * | 3/2002 | Reuter et al. | 711/206 |
| 2003/0142685 | A1 * | 7/2003 | Bare | 370/410 |
| 2003/0179707 | A1 * | 9/2003 | Bare | 370/235 |
| 2005/0081187 | A1 * | 4/2005 | Odinak et al. | 717/101 |
| 2005/0180345 | A1 * | 8/2005 | Meier | 370/310 |
| 2006/0039378 | A1 * | 2/2006 | Medina et al. | 370/392 |
| 2009/0296717 | A1 * | 12/2009 | Medina et al. | 370/395.32 |

* cited by examiner

| Virtual Disk Block(2) 220 | Storage Location 230 | | Alternate Storage Location 235 | | Invalid 240 | Nw 250 | Z 260 | Error 270 | Alternate Exists? 255 | Bitmap 225 |
|---|---|---|---|---|---|---|---|---|---|---|
| | LUN 232 | Block(s) 234 | LUN 236 | Block(2) 238 | | | | | | |
| 1-10 | 1 | 1-10 | 2 | 11-20 | no | no | no | no | yes | 3,8,9 |
| 11-20 | 2 | 1-10 | 2 | 21-30 | no | yes | no | no | no | |
| 21-20 | 1 | 11-20 | 1 | 21-30 | no | no | no | no | no | |

| Virtual Disk Block(2) 220 | Storage Location 230 | | Invalid 240 | Nw 250 | Z 260 | Error 270 | Alternate Exists? 255 | Alternate Table 215 |
|---|---|---|---|---|---|---|---|---|
| | LUN 232 | Block(s) 234 | | | | | | |
| 1-10 | 1 | 1-10 | no | no | no | no | yes | 1 |
| 11-20 | 2 | 1-10 | no | yes | no | no | no | |
| 21-20 | 1 | 11-20 | no | no | no | no | no | |

← 203

| Alternate Table #1 (215) | | | Bitmap 225 |
|---|---|---|---|
| Virtual Disk Block(2) 220 | Alternate Storage Location 235 | | |
| | LUN 236 | Block(2) 238 | |
| 1-10 | 2 | 11-20 | 3,8,9 |
| 11-20 | 2 | 21-30 | |
| 21-20 | 1 | 21-30 | |

CENTRALIZED FINE-GRAINED ENHANCEMENTS FOR DISTRIBUTED TABLE DRIVEN I/O MAPPING

RELATED APPLICATIONS

This application claims priority from U.S. Provisional Application Nos. 60/209,109 and 60/209,326, filed on Jun. 2, 2000, the disclosures of which are hereby incorporated by reference in full.

FIELD OF THE INVENTION

The present invention relates to a virtual data storage system, and more particularly to a distributed, table-driven virtual storage system having mapping table entries, each mapping a virtual storage segment to a first actual storage segment and an alternative second actual segment.

BACKGROUND OF THE INVENTION

In a table driven, virtual storage network, a table maps virtual disk segments to physical storage locations. A key issue in forming the virtual storage network is the selection of a method to map the virtual storage to the actual storage. For example, a virtual storage network can map fixed-sized segments of contiguous blocks in each mapping table entry. For mapping efficiency, these segments need to be fairly large, e.g., on the order of one megabyte of virtual disk data. One problem with using large segments is the relatively long time period needed to copy a large block of the underlying non-virtual storage during the copying or migration of data. During such data movement operations, the data segments being moved cannot be accessed, and any virtual disk input/output (I/O) operations to these segments must be delayed until data movement is finished. Such delay is typically accomplished by setting a state in the mapping table entry to prevent I/O operations to the effected segment during data movement. For large segments, however, the delays can add unacceptably long latencies to the virtual disk I/O operations and adversely affect performance of the storage system.

The problem of undesirably large latencies during data movement operations may be solved by using smaller segments. Unfortunately, the use of smaller data segments increases the costs associated with mapping, such as the overhead of storing and managing a much larger number of map entries. A small data segment configuration also potentially reduces the amount of contiguous data on the non-virtual storage, causing fragmented storage.

An ideal virtual storage system, therefore, has a mapping system that achieves the benefits for both large segment and small segment mapping. In particular, an ideal mapping system would achieve the low administrative cost of larger storage segmentation and the reduced latencies of smaller storage segmentation.

SUMMARY OF THE INVENTION

In response to these and other needs, the present invention provides a virtual storage system that generally uses larger segmentations, but has the ability to divide the large segments into smaller sub-segments during data movement operations. The mapping has large segments except for those segments undergoing data movement, wherein the virtual disk mapping uses the smallest segment size possible, namely, a single disk block. The present invention provides a method and system having a combination of segment sizes: a large segment for normal uses and single disk block segments for data movement. In this way, the administration costs are generally low, and latencies caused by the movement of large data blocks are avoided.

The combination of segment sizes is accomplished in the present invention through a distributed virtual storage system having a controller that manages the mapping table and multiple agents that present the mapping to devices on the network. The present invention adapts the mapping table to include a first and a second storage location and a bit map of the actual storage segments. When the first storage location is occupied during a move operation, the controller causes other I/O operations to occur at the second location. The bitmap stores, on a block by block basis, the blocks at the second location affected by the other I/O operations. During future operations, the mapping table maps to the first storage location, except for the blocks indicated in the bitmap.

BRIEF DESCRIPTION OF THE DRAWINGS

These and other advantages of the present invention are more fully described in the following drawings and accompanying text in which like reference numbers represent corresponding parts throughout:

FIGS. 2A, 2B, and 2C are illustrations of a table for mapping virtual storage to physical storage in accordance with embodiments of the present invention;

FIGS. 3-5A and 5B are flow charts illustrating data migrations processes using the virtual storage network of FIGS. 1A-1B.

DETAILED DESCRIPTION OF THE PREFERRED EMBODIMENT

Figure 1A:
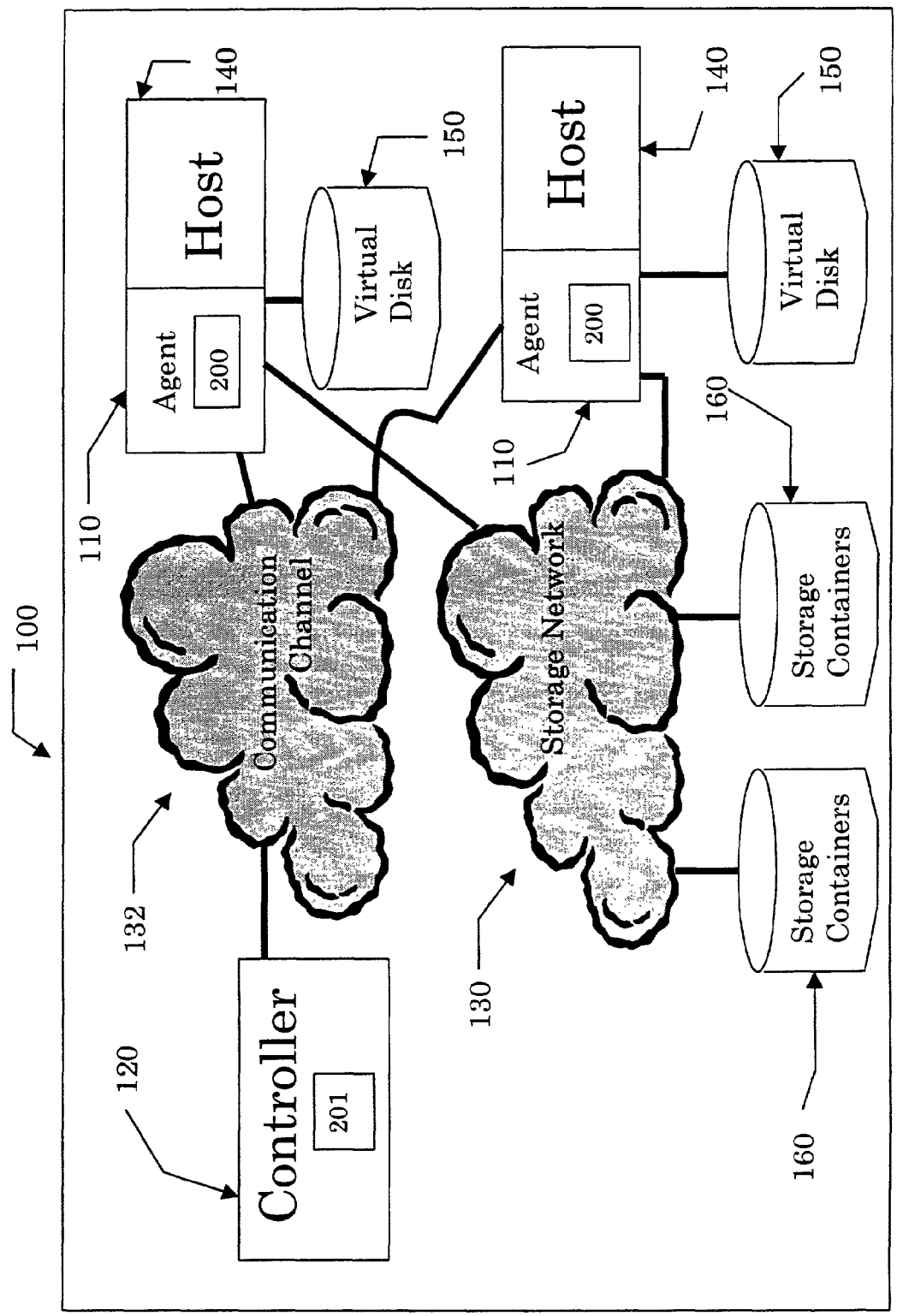
FIGS. 1A and 1B are schematic illustrations of a distributed virtual storage network in accordance with embodiments of the present invention.
Figure 1B:
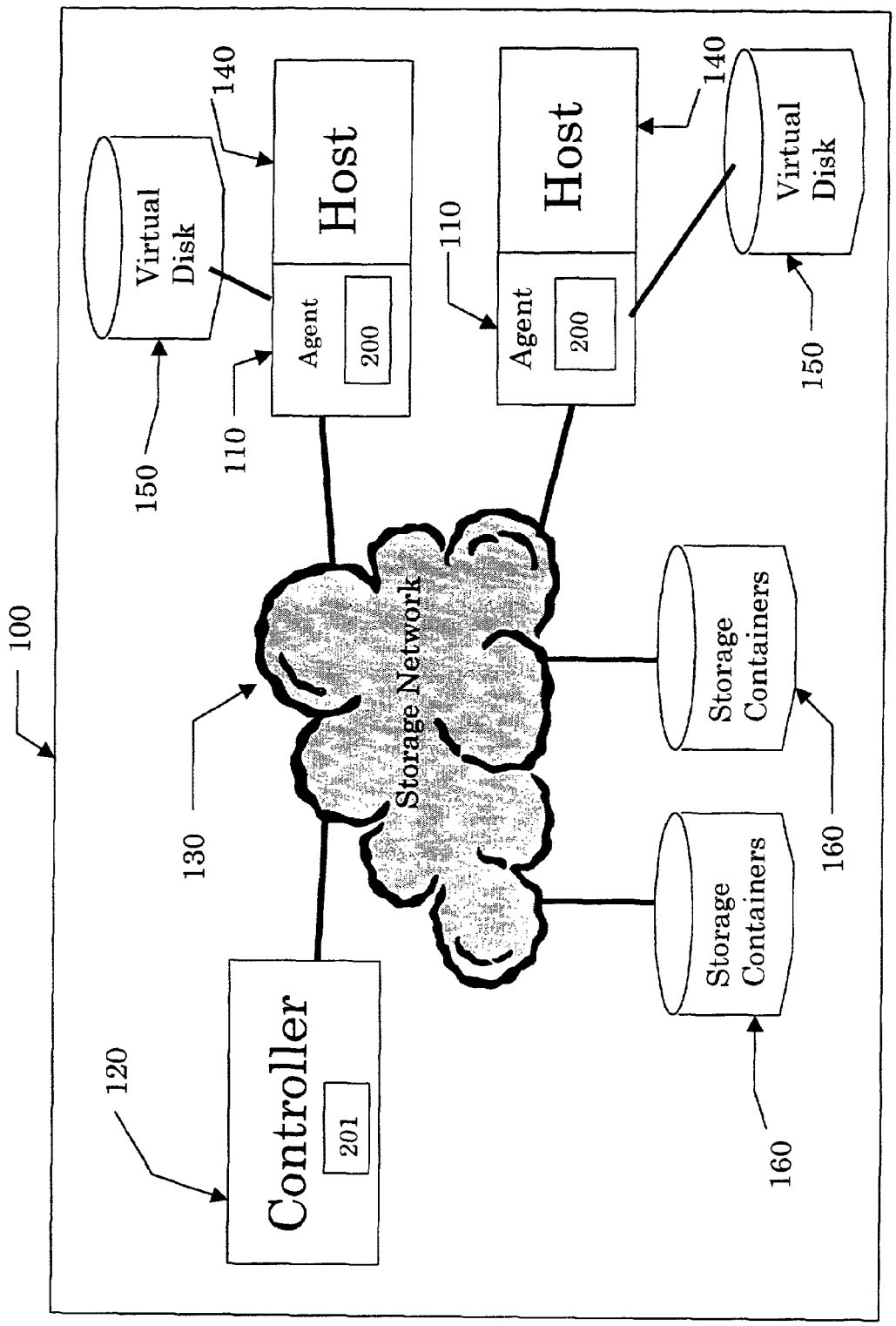

The present invention applies to a virtualized storage area network (SAN) system 100 using one or more distributed mapping tables 200, as needed to form one or more virtual disks for I/O operations between hosts 140 and storage containers 160, as illustrated in FIGS. 1A-1B. In particular, the table 200 contains a mapping that relates position in a virtual disk 150 with an actual location on the storage containers 160. The specific contents of the table 200 are described in greater detail below.

The system 100 principles of distributed, virtual table mapping can be applied to any known storage network 130. It should therefore be appreciated that the storage containers 160 are known technologies and may refer to any type of present or future known programmable digital storage medium, including but not limited to disk and tape drives, writeable optical drives, etc. Similarly, the hosts 140 may be any devices, such as a computer, printer, etc. that connect to a network to access data from a storage container 160.

Likewise, the storage network 130 is also intended to include any communication technology, either currently known or developed in the future, such as the various implementations of Small Computer Systems Interface (SCSI) or Fibre Channel. This distributed virtualization is most useful in environments where a large amount of storage is available and connected using some sort of storage network infrastructure. One preferred implementation uses Switched Fibre- Channel connected storage. However, nothing in the design of the system 100 precludes its use on other types of storage networks 130, including storage networks that are not yet invented.

The hosts 140 issues I/O operation commands to the virtual disks 150, and in response, mapping agents 110 access the table 200. In this way, the agents 110 isolate the table 200 from general access by the host, but are generally associated with the hosts 140. While the mapping agent 110 may reside on the host 140, the agent 110 may also reside as a separate component in the virtual storage network 100. Preferably, each of the hosts 140 has a separate agent 110, providing each host with a separate mapping table 200. Alternatively, the system 100 could be configured so that more than one host 140 connects to an agent 110. If multiple hosts 140 connect to the same agent 110, the hosts 140 share access to the particular table 200. The agent 110 stores the mapping table 200 in volatile memory such as DRAM. As a result, if one of the agents 110 loses power, that agent 110 loses its copy of the table 200. Such an event could take place if the mapping agent 110 is embedded in the host 140, for example, a backplane card serving as the mapping agent 110, and the host 140 system loses power. By storing the mapping table 200 in volatile memory, the table 200 may be easily and rapidly accessed and modified on the agents 110. Storing the mapping table 200 in volatile memory has the further advantage of substantially reducing the cost and complexity of implementing the agents 110 as mapping agents. Overall, the agents 110 allow the performance-sensitive mapping process to be parallelized and distributed optimally for performance. The system 100 further comprises a controller 120 that is separate from the mapping agents 110. The controller 120 administers and distributes the mapping table 200 to the agents 110. Control of the mapping table 200 is centralized in the controller 120 for optimal cost, management, and other implementation practicalities. In particular, the controller 120 stores a centralized mapping table 201 in a semi-permanent digital memory, preferably a magnetic disk for high storage capacity and fast, frequent write capabilities, and uses portions of the centralized mapping table 201 to form the mapping table 200 stored at the agents 110. By storing the centralized mapping table 201 in nonvolatile memory, the controller 120 retains the centralized mapping table 201 even after a power loss. In this way, the responsibility for persistent storage of the mapping tables 200 lies in the controller 120.

The exact design of the controller 120 is not a subject of this disclosure. Instead, this disclosure focuses on structure of the overall system and the interfaces between the mapping agent 110 and the controller 120. Accordingly, it should be appreciated that any controller, as known in the art of digital information storage, may be employed as needed to implement the present invention. Within this framework, each of the mapping agents 110 preferably interacts only with the controller 120 and not with the other agents 110. Furthermore, the architecture allows for a controller 120 comprised of redundant, cooperating physical elements that are able to achieve very high availability. As a result, the system 100 is highly scaleable and tolerant of component failures.

As described below, the interaction of the controller 120 and the agents 110 are defined in terms of functions and return values. As depicted in FIG. 1A, this communication is implemented on system 100 with messages on some sort of network transport such as a communication channel 132. The communication channel 132 may employ any type of known data transfer protocol such as TCP/IP. In one implementation of the system 100, illustrated in FIG. 1B, the communication channel 132 is the storage network 130 itself. Any suitable technique may be used to translate commands, faults, and responses to network messages. The particular interactions between the functions and activities of the controller 120 are described in greater detail below.

Figure 2C:
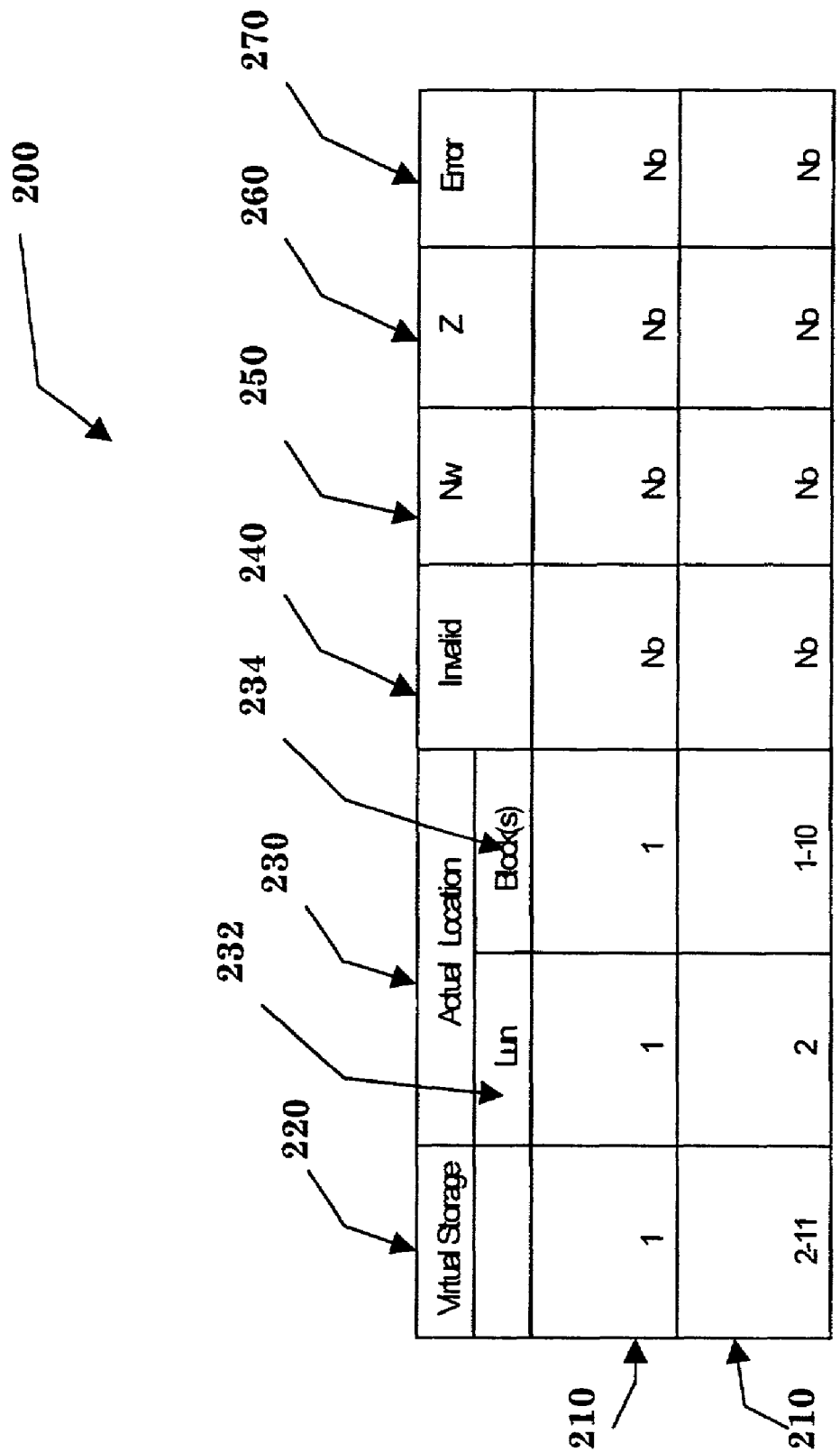

FIG. 2A schematically illustrates the contents of the centralized mapping table 201 stored in the controller 120, and FIG. 2C schematically illustrates the contents of the mapping table 200 located at the agents 110. All of the fields in the mapping table 200 and the centralized mapping table 201 are simple integers or binary state values. Both the centralized mapping table 201 and the mapping table 200 contain entries 210 (rows) that include a mapping between virtual disk segments 220 and storage locations 230 on the storage containers 150. The storage location 230 is a numerical designation identifying a particular storage device and a portion of the storage container 160 that maps to the virtual disk segment 220. The form for the storage locations 230 must be appropriate for the storage network being used. In a SCSI network, each of the storage locations 230 include a Logical Unit Number (LUN) identifier 232 and a block identifier 234, also called an offset.

As illustrated in FIG. 2A, the centralized mapping table 201 further includes an alternate storage location 235, generally having a second LUN identifier 236 and a second block identifier 238. In the centralized mapping table 201, each of the table entries 210 also contains a block bit map 225, preferably with one bit per disk block in the virtual segment. The block bitmap 225 contains one bit per disk block in the segment where a set bit indicates that its corresponding block in the segment has been written in the alternate storage location 235. The functions for the alternate storage location 235 and the bitmap 225 are described in greater detail below.

In addition to mapping information specifying the storage location, each mapping table entry 210 in the mapping table 200 and the centralized mapping table 201 also contains several states. The states are Boolean variables that provide information on the current status of the virtual disk segment and are important because they allow the mapping table 200 stored in the mapping agent 110 to be remotely loaded and manipulated from the controller 120. These states and interfaces provide the ability for the mapping tables to be distributed and for mapping table entries to be volatile.

This disclosure first describes the states prior to explaining some of the functions for the states. The table 200 and the centralized table 201 generally include at least two states: (1) an invalid state 240 indicating whether any I/O operations may occur on the virtual disk segment 220 and the corresponding physical storage location 230; and (2) a no-write (Nw) state 250 indicating whether the data contained at the corresponding physical storage location 230 may be changed. The invalid state 240 and the Nw state 250 are particularly important in allowing dynamic loading of mapping table entries, dynamic mapping changes, volatility of mapping table entries, and data sharing among similar virtual disks.

When activated, the invalid state 240 generally indicates that the mapping table entry 210 contains no useable mapping information and cannot support I/O operations. Any attempt to implement an I/O operation through this table entry 210 causes the mapping agent 110 to send a fault message to the controller 120. The agent 110 does not proceed with the I/O operation until the controller 120 returns a fault response. In one configuration, the system 100 initially activates the invalid state 240 for all entries 210 in the mapping table 200 and the centralized mapping table 201 when the tables 200 and 201 are newly created. In this way, the mapping table 200 and the centralized table 201 ignores any residual entries in memory from previously stored tables to insure that current entries are active and reliable. Similarly, the invalid state 240 may be activated when the entry 210 in the table 200 is "forgotten" and lost by the agent 110 volatile memory. If the invalid state 240 is activated in the entry 210, then all other values and states in the entry 210 are assumed to contain no valid information and are ignored.

Because the tables 200 located in the mapping agents 110 are volatile, any failure or restart of the mapping agents 110 activates the invalid state 240 for all of the entries 210 in the tables 200. A sustained loss of communication between the controller 120 and the mapping agent 110 cause I/O operations to stop, either by activating the invalid state 240 for all mapping table entries 210 or by adding additional mechanisms to suspend I/O operations until directed by the controller 120 to resume I/O operations or until the system 100 otherwise causes an I/O operation at the segment despite the active invalid state 240. This configuration, however, allows the controller 120 to continue coordinating other mapping agents 110 by indicating that a failed or unreachable mapping agent 110 has been placed into a known state, providing the controller 120 data access to the surviving mapping agents 110.

As presented above, the Nw state 250, when activated, indicates that any write operations to the virtual disk segment(s) 220 represented by the entry 210 cause the agent 110 to send a fault message to the controller 120. The agent 110 does not generally allow the host to write to the storage locations 230 until the controller 120 returns a fault response to deactivate the Nw state 250. Alternatively, the system 100 may otherwise cause a write operation at the designated segment despite the active Nw state 250, as described in greater detail below. Unlike the invalid state 240, the activated Nw state 250 does not prevent read operations from generating faults. Instead, the agent 110 generally allows the host to proceed to access data at the storage location 230. Accordingly, if only the Nw state is activated, the mapping table entry 210 must contain a useable storage location 230.

An alternate_exists flag 255 generally indicates that the alternate storage location 235 and the fine-grained bitmap 225 contain valid data. The alternate_exists flag 255 is set only when a data movement copy has been scheduled or started. When the alternate_exists flag 255 is not activated, the alternate storage location 235 and the block bitmap 225 do not contain valid information.

In another configuration, the mapping table 200 and the centralized mapping table 201 further include a zero (Z) state 260. When active, the Z state 260 indicates that the virtual disk segment 220 represented by the entry 210 contains all zero bytes. This feature allows a virtual disk to be created and gives the virtual disk the appearance of being initialized without the need to allocate or adjust any underlying non-virtual storage. If an entry 210 contains an active Z state 260, the agent 110 ignores the storage location 230. If the host attempts to read information stored at a storage location 230, the agent 110 returns only zero-filled blocks regardless of the actual contents of the storage location 230. On the other hand, any attempts to write data to the storage location 230 when Z state 260 is activated cause the agent 110 to send a fault message to the controller 120. The agent 110 does not allow the host to write to the storage locations 230 until the controller 120 returns a fault response that deactivates the Z state 260.

In another configuration, the mapping table 200 and the centralized table 201 further include an error (E) state 270. When active, the E state 270 indicates the existence of an error condition preventing I/O operations to the virtual disk segment 220 represented by the table entry 210. If an entry 210 contains an active E state 270, the agent 110 ignores the storage location 230. If the host attempts to read from or write to the storage location 230, the agent 110 returns an error to the host.

In centralized mapping table 201, the fine-grained bitmap 225 is larger than the other elements of the centralized mapping table 201, even though the bitmap 225 and alternate storage location 235 are needed only when writing to a segment being copied. Therefore, a preferred embodiment of the invention uses an alternative centralized mapping table 201, as illustrated in FIG. 2B. In this configuration, the centralized mapping table 201 is divided into two sub-tables. In the centralized mapping table 201, a main mapping table 203 contains the actual disk segment number (table index) 210; a storage container ID 232; a storage container segment offset 234; invalid, Nw, Z, E, alternate_exists map states (respectively 240, 250, 260, 270, and 255); and an alternate mapping table index 215. The centralized mapping table 201 further includes an alternate storage container mapping table 207 contains the alternate mapping table index 215; the alternate storage container 236; the alternate storage container segment offset 238; and the fine-grained block bitmap 225. It should be appreciated that the contents and operation of the mapping table 200 are unaffected by the controller 120 use of the alternative centralized mapping table 201.

The interaction of the agent 110 and the controller 120 is now described in greater detail. In one category of interactions, fault/response operations, the agent 110 sends a message to the controller 120 to indicate the occurrence of a fault during an I/O operation to the table 200. Typically, the fault occurs as a result of an activated state, as described above, that prevents the execution of the I/O operation by the agent. The agent 110 sends the fault message to the controller 120. The controller 120 then determines an appropriate action and commands the agent 110 accordingly.

In one type of a fault/response operation, a map fault, the mapping agent 110 alerts the controller 120 that an I/O operation requested by the host cannot be completed because the mapping table entry 210 has an activated state preventing the completion of the requested I/O operation. For instance, the mapping agent 110 produces a fault message to the controller 120 in response to any request for an I/O operation to, or from, a table entry 210 having an activated invalid flag 240 or in response to an attempt to write to a storage container location 230 having an active corresponding Nw flag 250.

The map fault message from the agent 110 generally identifies the requested I/O operation, the virtual disk segment 220 involved, and the table state preventing the I/O operation. After a fault occurs, the agent does not attempt to carry out the I/O operation. Instead, the controller 120 uses the fault message to select the proper response to the faulted I/O operation (e.g. load map entry, change map entry, delay until some other operation has completed). The controller 120 response informs the mapping agent 110 how to proceed to overcome the cause for the fault.

The controller 120 generally instructs the agent 110 either to resolve the problem or to send an error message to the requesting host. When resolving the problem, the controller 120 sends a replacement table entry 210. The agent 110 inserts the new table entry 210 in the table (to replace the former faulty entry) and then retries the I/O operation. If the controller 120 cannot resolve the problem, it instructs the mapping agent 110 to issue an error message to the host and to activate the error state 260 for the table entry 210 causing the fault. As described above, the agent 110 then issues an error message to the host regardless of the other contents of the table entry 210.

Commands to the agent 110 initiated by the controller 120 comprise a second category of interactions, command/response operations. These commands, initiated by the controller 120, include the creation of a new mapping table 200 and centralized mapping table 201 with all entries set to have an activated invalid flag 240 or the deletion of an existing table 200 and centralized mapping table 201 (new_table). Additionally, the controller 120 may obtain from the agent 110 the contents of one of the entries 210 in the table 200 (get_entry) or the status of the one of the states in this entry 210 in the table 200 (get_status). The controller 120 can further order the agent 110 to set all of the contents for one of the entries 210 (set_entry) or the status of one of the states for the entry 210 (set_status).

Once the invalid state 240, the error state 260, or the zero state 270 are active, the controller 120 cannot deactivate the state because, as described above, initial activation of these states voids the storage location 230 in the table 200 and centralized mapping table 201. To deactivate these states, the controller 120 must instruct the agent 110 to replace the existing entry 210 in the table 200 with an entirely new entry (set_entry) in the table 201. For each of these commands, the agent 110 returns a response to the controller 120 after completing the ordered task.

When the controller 120 instructs the agent 110 to either set or obtain information from the mapping table 200, the system optimally allows the controller 120 to specify multiple, contiguous map table entries 210 in a single command. This functionality allows the agent 110 and the controller 120 to interact more efficiently, with fewer instructions. However, when the controller 120 commands the agent 110 to set or modify one or more of the values in the table entries 210 such as one or more of the states, the controller 120 command to the agent 110 optimally includes a "blocking" flag. During an I/O operation, the activation of the blocking flag prompts the agent 110 to change the table 200 immediately, but agent 110 should not respond to the controller 120 until after the completion of any prior I/O operations initiated before the controller 120 command. In this way, the agent 110 notifies the controller 120 of the completion of previous I/O operations using the unchanged table 200, as it existed prior to the command.

In the majority of the operations, the mapping agent 110 operates without fault. In non-fault cases, the mapping table entries 210 are valid and do not have any activated states that prevent the requested I/O operation. The virtual disk 150 I/O operations function entirely through the mapping agent 110, allowing the I/O operation proceeds through the mapping table 200 and directly to the physical storage devices without any involvement by the controller 120. As a result, the controller 120 inserts itself into an I/O stream only when needed to perform various management operations and typically does not become involved in non-faulting cases.

Because the controller 120 is typically not involved in the I/O operations, the system 100 has high performance and scalability. Furthermore, the system has a high degree of redundancy as a persistent copy of the contents of the mapping table 200 for the virtual disk exists on centralized mapping table 201 at the controller 120, and volatile copies of some or all entries in the centralized mapping table 201 are distributed to at least one mapping agent 110.

This disclosure now describes a process for copying the disk data. The following description generally uses a virtual mapping table 200 and centralized mapping table 201 that map physical blocks of fixed size because of its relatively simple management. Therefore, the system 100 generally allows virtual disk data copying to be done on a per-map-entry basis, preferably fixed-sized segments.

Figure 3:
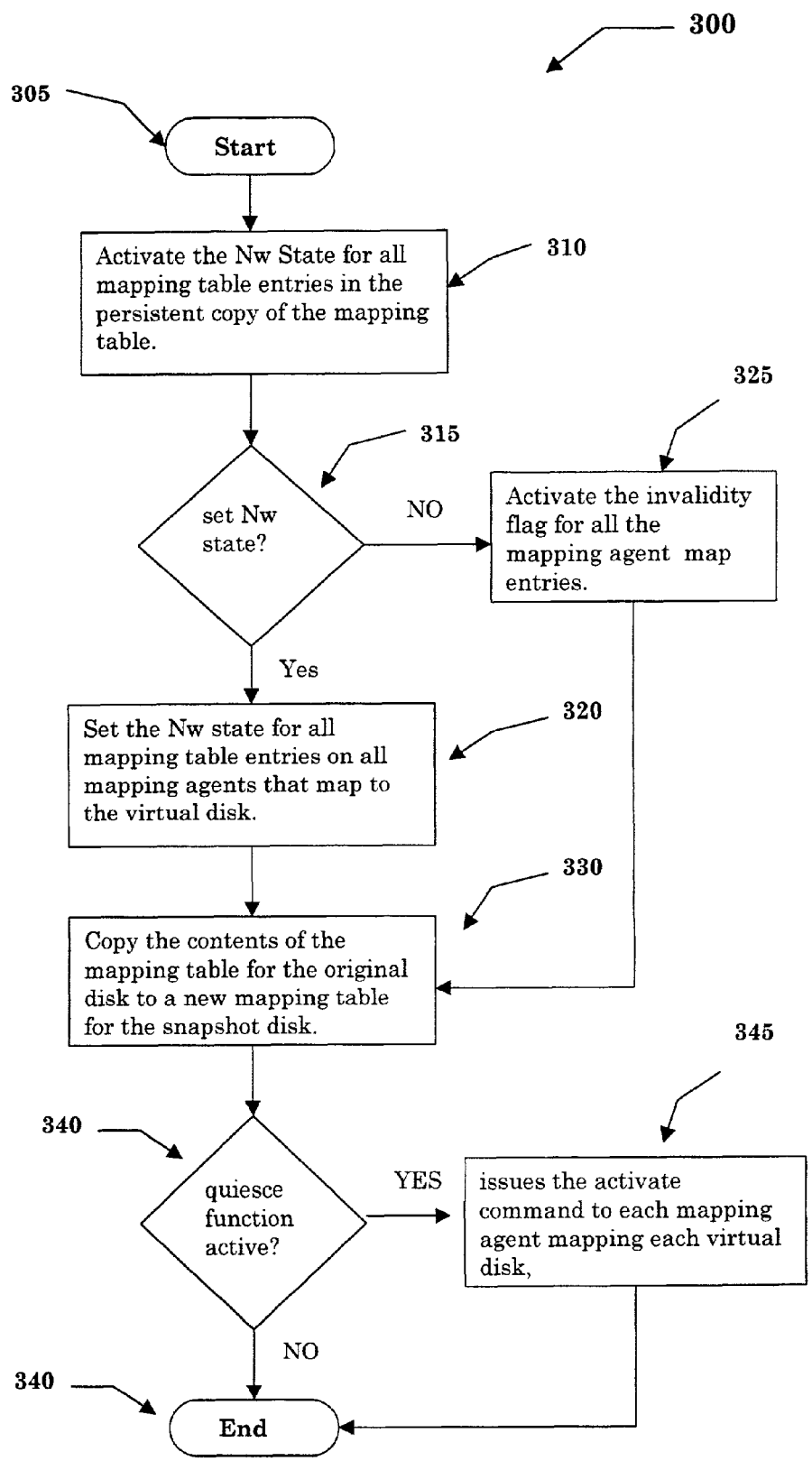

As illustrated in FIG. 3, in the context of a distributed table-driven virtual storage network, such as the above-described virtual storage system 100, a stored record of the contents of the virtual disk may be preserved by modifying the mapping table 200 and the centralized mapping table 201 to prevent any changes to the table entries 210 or to the data stored in the corresponding storage locations 230. This may be accomplished in table 200 and the centralized mapping table 201 by activating the Nw state 250 for any and all of the table entries 210 that map virtual disk blocks or segments 220 to storage locations 230.

The activation of the Nw state 250 for any and all of the table entries 210 is generally accomplished in the system 100 according to the following description of a disk copy 300 operation. The disk copy 300 operation begins at step 305. In step 310, the controller 120 activates the Nw state 250 for all mapping table entries 210 in the centralized mapping table 201 for the original disk. The controller 120 uses a set_entry_state command to communicate this change to the mapping table 200 of all of the mapping agents 110 that map to this virtual disk 150 by setting the Nw state 250 for all mapping table entries 210 in these mapping agents 110, step 320.

After this point, all attempts by host 140 to write to the virtual disk 150 in the table 200 generate mapping fault messages from the agent 110. Alternatively, if the Nw state is not set, step 315, the controller 120 may activate the invalid flag 240 for the tables 200 for all the mapping agent 110, step 325. The use of invalid flag 240 instead of the Nw flag 250 generates mapping faults for read operations that are otherwise allowed when the Nw state 250 is activated. The key concept is that, at a minimum, all write attempts by hosts through the table 200 at the agents 110 generate faults.

As described above, the controller 120 set_entry_state signals to the mapping agents 110 to activate the blocking flag. As a result, the mapping agent 110 allows all prior I/O operations to complete prior to responding to the controller 120 and implementing the changes to the Nw state 250. In this way, the controller 120 knows when all outstanding writes to the original disk are completed. The controller 120 then copies the entire contents of the centralized mapping table 201 for the original disk to a new centralized mapping table 2010 for the snapshot disk, step 330. The controller 120 then updates the mapping table 200 using the contents of the centralized mapping table 201. This step 330 includes copying the active Nw state 250 for the table entries 210, so that later attempts to write to the snapshot disk containing the copy also generate mapping faults to the controller 120. At this point, the snapshot disk has been created and all write operations to the original disk or the snapshot disk will cause the mapping agent 110 to generate mapping faults to the controller 120, as described above. The disk copy operation 300 concludes in step 340.

Figure 4:
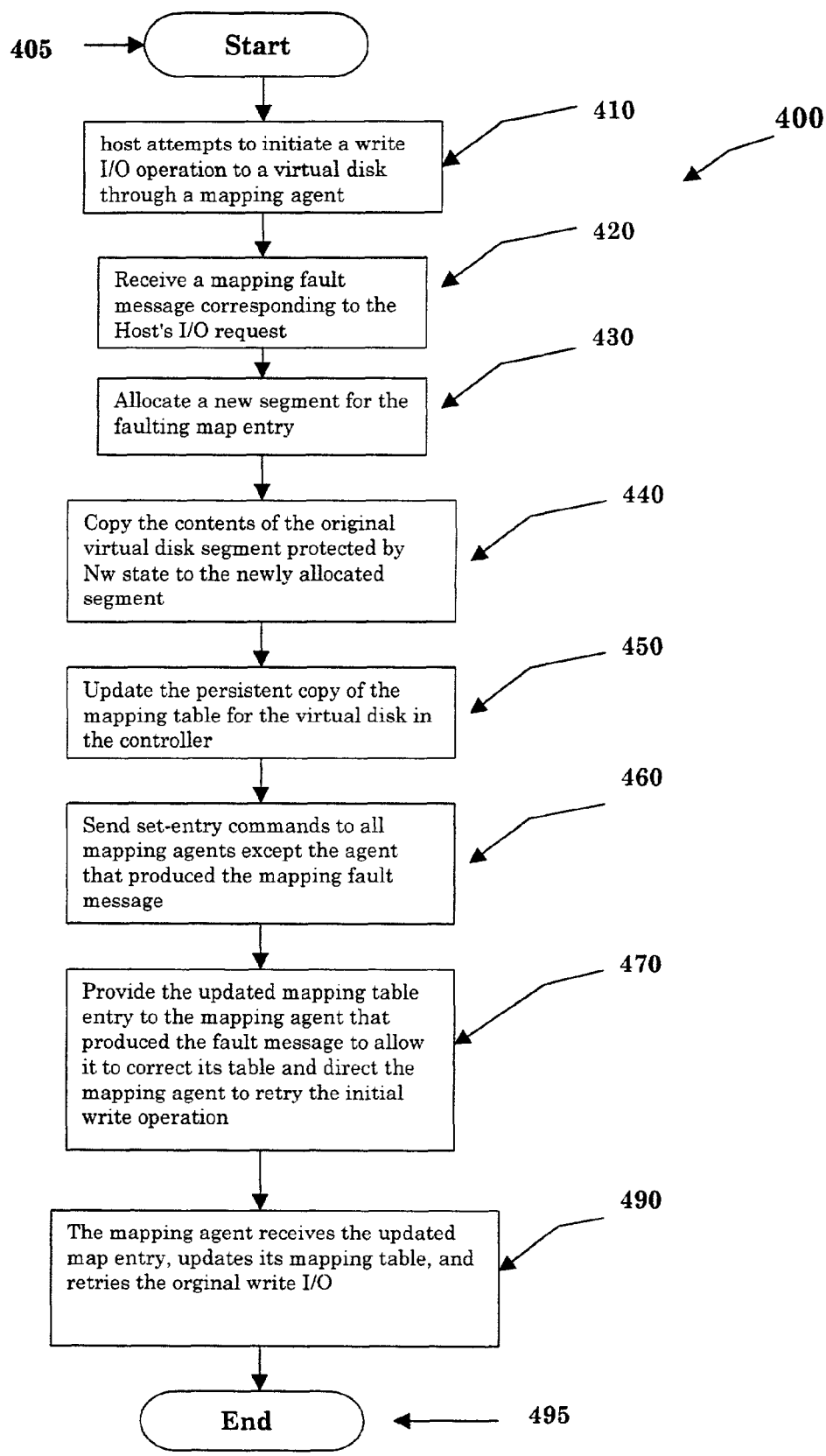

As illustrated in FIG. 4, a forward-delta process 400 addresses the mapping fault message caused by an attempt to write to the original disk or the snapshot disk. In the forward-delta process 400, the mapping agent 110 writes new data to newly allocated virtual disk segment while old data is preserved in the original segment. Although the following description assumes that the fault is against the original virtual disk, the same process would apply to mapping faults against the new snapshot virtual disk.

The forward-delta process 400 is initiated in step 405. In step 410, a host attempts to initiate a write I/O operation to either the new or old virtual disks through a mapping agent 110, causing the agent 110 to encounter an active Nw mapping state 250. As a result, the agent 110 issues a mapping fault message for the write to the controller 120, step 420. The controller 120 receives the write fault from the step 420 and allocates a new segment for the faulting map entry, step 430. The allocation of a new segment for the faulting map entry in step 430 presumes the availability of free segments on non-virtual storage and an infrastructure in the controller to manage allocation of these free segments. It should be appreciated that the particular mechanism and infrastructure to select and allocate free segments is beyond the scope of this disclosure.

The controller 120 copies the contents of the original virtual disk segment protected by the Nw state 250 to the newly allocated segment, step 440. The controller 120 then updates its persistent copy of the mapping table for the faulting virtual disk so that the faulting segment's Nw state 250 is cleared and the storage location 230 refers to the newly allocated segment, step 450.

The controller 120 then sends the set_entry commands to all mapping agents 110 except the particular agent 110 that produced the mapping fault message, step 460. The controller 120 remaps the virtual disk 150 in order to fix the mapping tables 200 (except in the particular agent that produced the mapping fault message) to match the centralized mapping table 201 in the controller from step 390. Specifically, the set_entry command contains the updated mapping table entry from the centralized mapping table 201 that specifies the new location for the writing I/O operations.

In step 470, the controller 120 responds to the mapping agent 110 that produced the fault message in step 420. In particular, the controller 120 provides information to fix the mapping table 200 in the agents 110 with the updated mapping table entry 210 from step 450 and further directs the mapping agent 110 to retry the write operation that caused the initial mapping fault in step 420. The mapping agent 110 then receives the updated map entry 210 from the controller 120, updates its mapping table 200, and retries the faulting write I/O, step 490. The forward-delta process concludes at step 495.

Figure 5A:
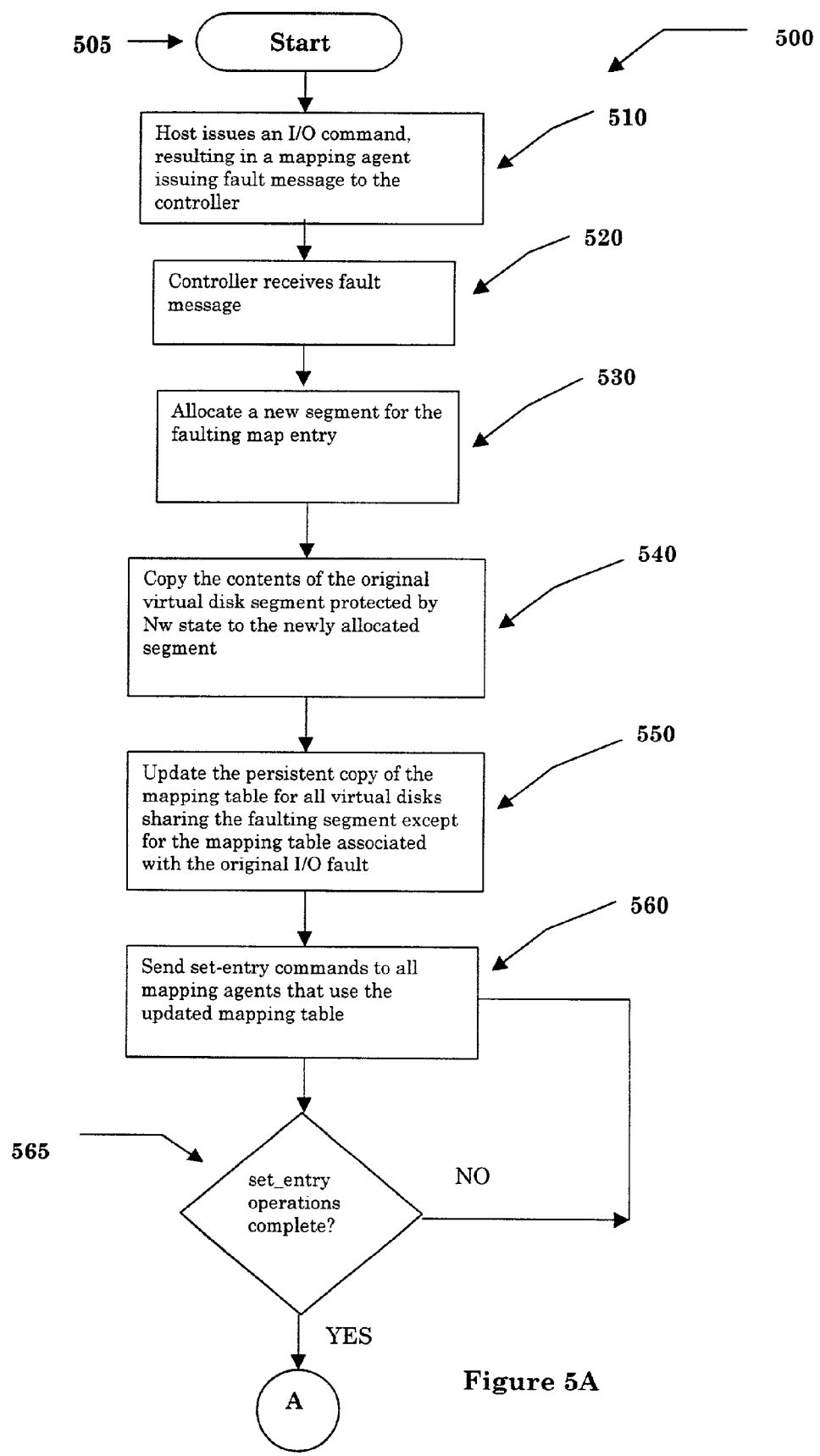
Figure 5B:
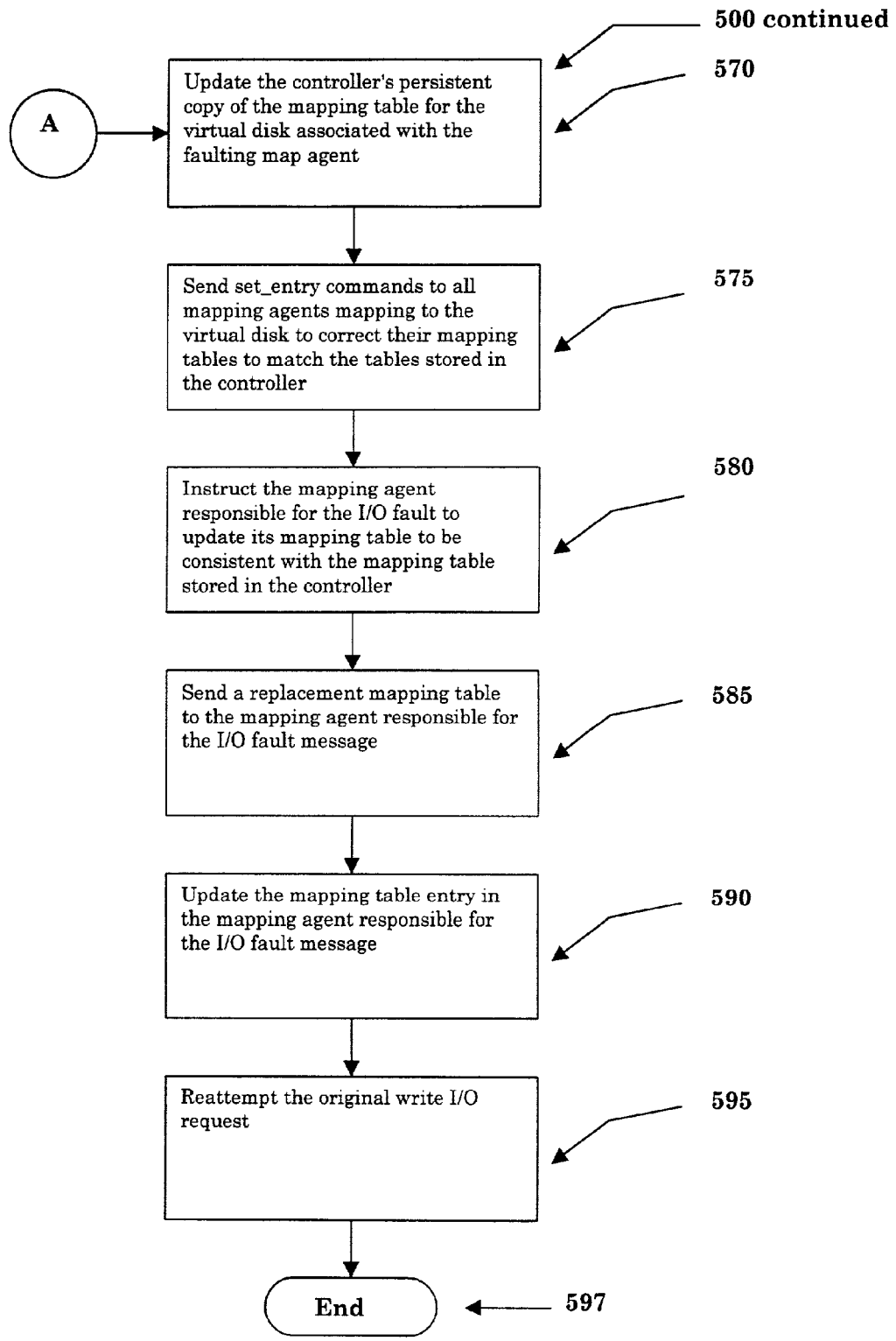

As illustrated in FIGS. 5A and 5B, a reverse-delta process 500, an alternative embodiment of the present invention, addresses the write faults caused by the disk copy process 300. The reverse-delta process 500 differs from the above described forward-delta process 400 in that the mapping agent 110 writes new data to the original virtual disk original segment while old data is preserved in the newly allocated segment.

The reverse-delta process 500 initiates in step 505 after a host attempts a write I/O operation through one of the mapping agents 110. The agent 110 encounters an activated Nw state 250 and sends to the controller 120 a mapping fault message for the write I/O, step 510. The controller 120 receives the write fault (step 520), allocates a new segment for the faulting map entry 210 (step 530), and copies the contents of the original virtual disk segment 210 protected by activated Nw state to the newly allocated segment, step 540.

The controller 120 then updates the centralized mapping table 201 for all the virtual disks that share the faulting segment 230 except for the mapping table that maps the particular virtual disk associated with the I/O fault, step 550. In particular, the controller 120 remaps the virtual disk segments 220 to the newly allocated storage location 230. To update the centralized mapping tables 201, the controller 120 deactivates the Nw state 250. As part of the step 550, the controller 120 changes the storage location 230 to refer to the newly allocated segment.

In step 560, the controller 120 sends set_entry commands to all mapping agents 110 that have write faults and remain in the original storage location. This action propagates the segment change and the Nw state change to the mapping tables 200 in these mapping agents 110. The set_entry activates the blocking flag, allowing the controller 120 to know when all outstanding read I/Os to this segment have finished before allowing any writes to proceed to the original segment. The controller 120 waits for these set_entry operations to complete before acting further.

After the mapping agents 110 send a message to the controller 120 indicating the completion of the set_entry operations in step 560, the controller 120 updates its centralized mapping table 201 for the virtual disk for the faulting map agent 110, step 570. For this particular mapping, the controller 120 deactivates the Nw state 250 on the faulting entry 210. The segment storage container location 230, however, does not change.

The controller 120 then sends set_entry commands to all mapping agents 110 mapping this virtual disk, except the faulting mapping agent 110, to fix their associated mapping tables to match the tables currently stored in the controller, step 575. The set_entry command contains the updated mapping table entry from step 570. In step 580, the controller 120 responds to the fault message from step 520 with instructions to update the affected agent's mapping table 200 according to the centralized mapping table 201 adjusted in the step 570. The controller 120 further orders the mapping agent 110 to retry the I/O operation using the new mapping table 200. The faulting mapping agent 110 subsequently receives the replacement mapping table 200 (step 585), updates its mapping table entry 210 in the mapping table 200 (step 590), and retries the faulting write I/O, step 595. At this point, the I/O operation completes because the subject table entry 210 does not contain an activated Nw state 250, step 597.

As can be discerned from the above descriptions, the reverse-delta process 500 involves potentially much more communication with more mapping agents 110 than the forward-delta scheme 400. Therefore, the delta process 400 is the preferred implementation of the present invention.

Within distributed, table-driven virtual storage networks, such as system 100, it is advantageous to allow consistent snapshots across multiple virtual disks. There is value in having the ability to create point-in-time, consistent snapshot copies across more than one virtual disk. For example, a single database may store its data across multiple virtual disks. Snapshots of each of these disks taken at different points in time will result in an inconsistent copy of the overall database. To address this concern, the design for the storage system must support some way to achieve a consistent copying across multiple virtual disks.

This goal may be accomplished through the use of two additional virtual disk functions, quiesce and activate. The quiesce function causes all host I/O operations issued to one of the mapping agents 110 to be queued and delayed in the mapping agent 110 prior to mapping operations in either the forward-delta or reverse-delta processes, 400 or 500. In effect, the quiesce function puts up a "barrier" to allow multiple I/O streams to be synchronized. With the quiesce command, the mapping agent 110 does not return a response to the controller setting commands until all I/O operations that were already in progress have completed. The quiesce operation may optionally include a time parameter to provide more error handling opportunities when in-progress I/O operations do not complete in a timely manner—thereby causing mapping agent 110 to produce a fault message if the quiesce function lasts longer than the specified time limit. In contrast, the activate function causes all host I/O operations queued by the quiesce function to be released for processing after remapping in either the forward-delta or reverse-delta processes, 400 or 500. The mapping agents 110 must support this operation, so new command/response messages must be defined to support the quiesce and activate operations.

With the above described structure of the table 200, data movement to and from a physical storage container 230 can be implemented by copying pieces smaller than a full segment, with appropriate bits set in the bitmap 225 for those blocks that have been copied to the new location. Virtual disk 150 read operations may then use the storage location 230, alternate storage location 235, and block bitmap information 225 to determine the correct locations from which to read each disk block in the virtual disk segment 220. Write operations to a segment being migrated must still produce write faults using the Nw state. This configuration is necessary because changes to a storage segment during data movement must be coordinated with other I/O operations.

In the present invention, the controller 120 implements the full fine-grained model and uses the invalid state 240 and the Nw state 250 to manage the fine-grained effect in the mapping agent 110. This setup allows the mapping agent 110 to remain very simple, having minimal processing and decision components. Some command/response functions are necessary to complete the present invention's centralized implementation of fine-grained mapping to enable implementation of the full fine-grained map structure through the controller 120. For example, the controller 120 may issue a do_split_read command to the map agent, which is used during a faulted read operation to allow the mapping agent 110 to perform the read from both the old and new (alternate) segments, 230 and 235. The fine-grained bitmap 225 indicates the segment from which to obtain the data block. Similarly, a do_write command allows the controller 120 to direct the mapping agent 110 to write to the alternate segment 235.

Implementation of the fine-grained mapping further requires that any map fault commands be able to identify the fine-grained bitmap 225, thereby indicating which blocks are currently being read, or written to, during the I/O operation causing the fault. Implementation of the fine-grained mapping also requires a new mapping fault response, complete_to_host, informing the mapping agent 110 that an I/O operation that previously caused a fault message has been completed by another command (such as the do_split_read and do_write commands described above) and to signal completion to the host 140.

Figure 6A:
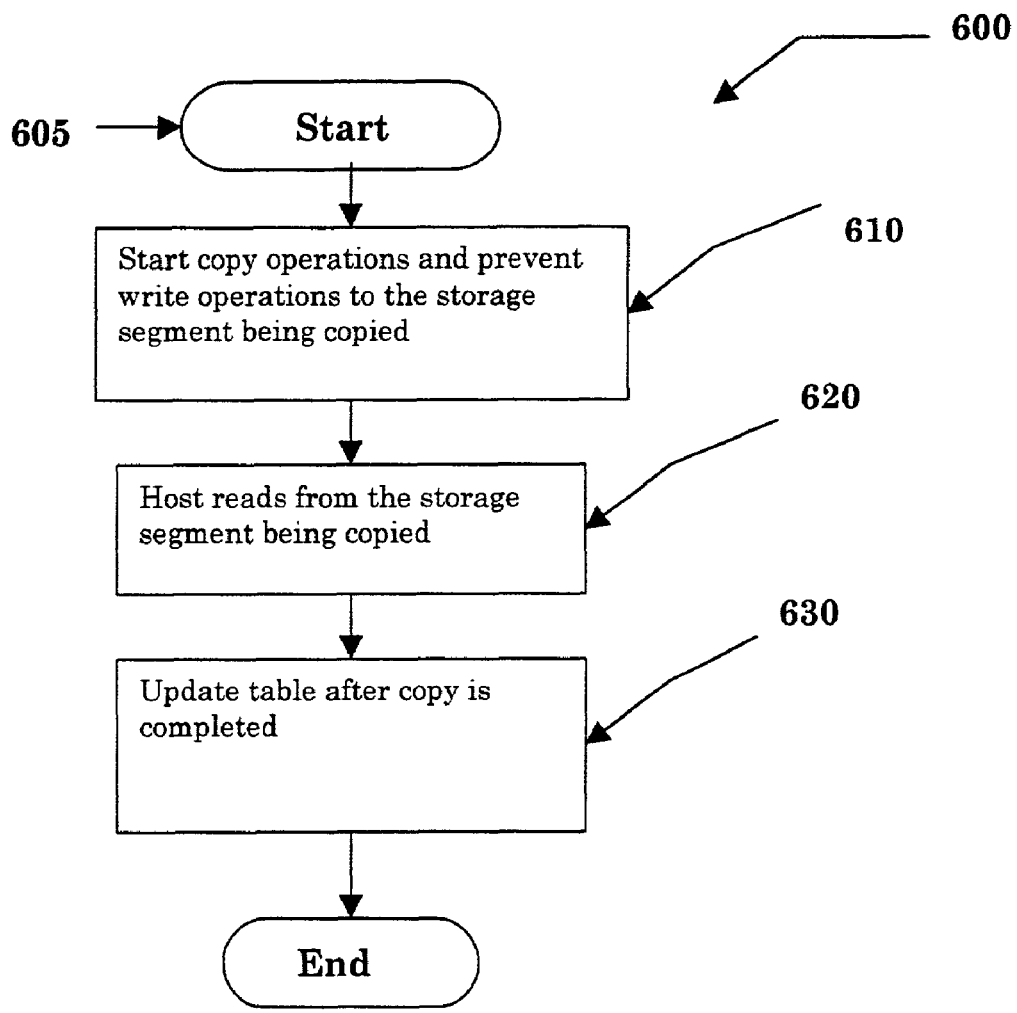
FIGS. 6A-6B are flow charts illustrating the steps in various I/O operations using the distributed virtual storage network of FIGS. 1A-1B and the tables of FIGS. 2A-2B in accordance with embodiments of the present invention.

Implementations of the system 100 for various I/O operations are now described using the forward delta process of FIG. 4. FIG. 6A illustrates a process 600 for reading a data segment while the segment is being copied, starting at step 605. During the copy, the controller 120 activates the Nw state 250 for the effected entry 210, step 610. The change occurs in the centralized mapping table 201 persistently stored in the controller 120 and the tables 200 temporarily stored in the volatile memory in the mapping agents 110. As a result, the subject storage segment cannot be changed during copying. Specifically, the controller 120 issues the set_entry_state command to activate the Nw state 250 for the specific segment.

As described above, attempts by the controller 120 to set the table entry 210 activate the blocking flag. The agent 110 then receives the set_entry_state command to set the Nw state and responds to the command by sending a message to the controller 120. Because the blocking flag is set, the mapping agent's 110 I/O response indicates that there are no outstanding writes to the segment. The controller 120 then begins the segment copy. Data from the segment may be read during the copy, step 620, because the active Nw state 250 allows read operations on the segment being copied. The agent 110 allows the read operations and notifies the controller 120 when the read operation is completed. Upon completion of the copy operation, the controller 120 issues the set_entry command to the agents 110 to clear the Nw state 250 and sets a new storage location 230. After the controller 120 receives a response from the agent 110 confirming the clearing of the Nw state, the set_entry command activates the blocking flag to inform the controller 120 that there are no more outstanding I/O operations to the old segment. The controller 120 may then dispose of, or reuse, the old segment appropriately and updates the centralized mapping table 201 and the mapping table 200, step 630.

Figure 6B:
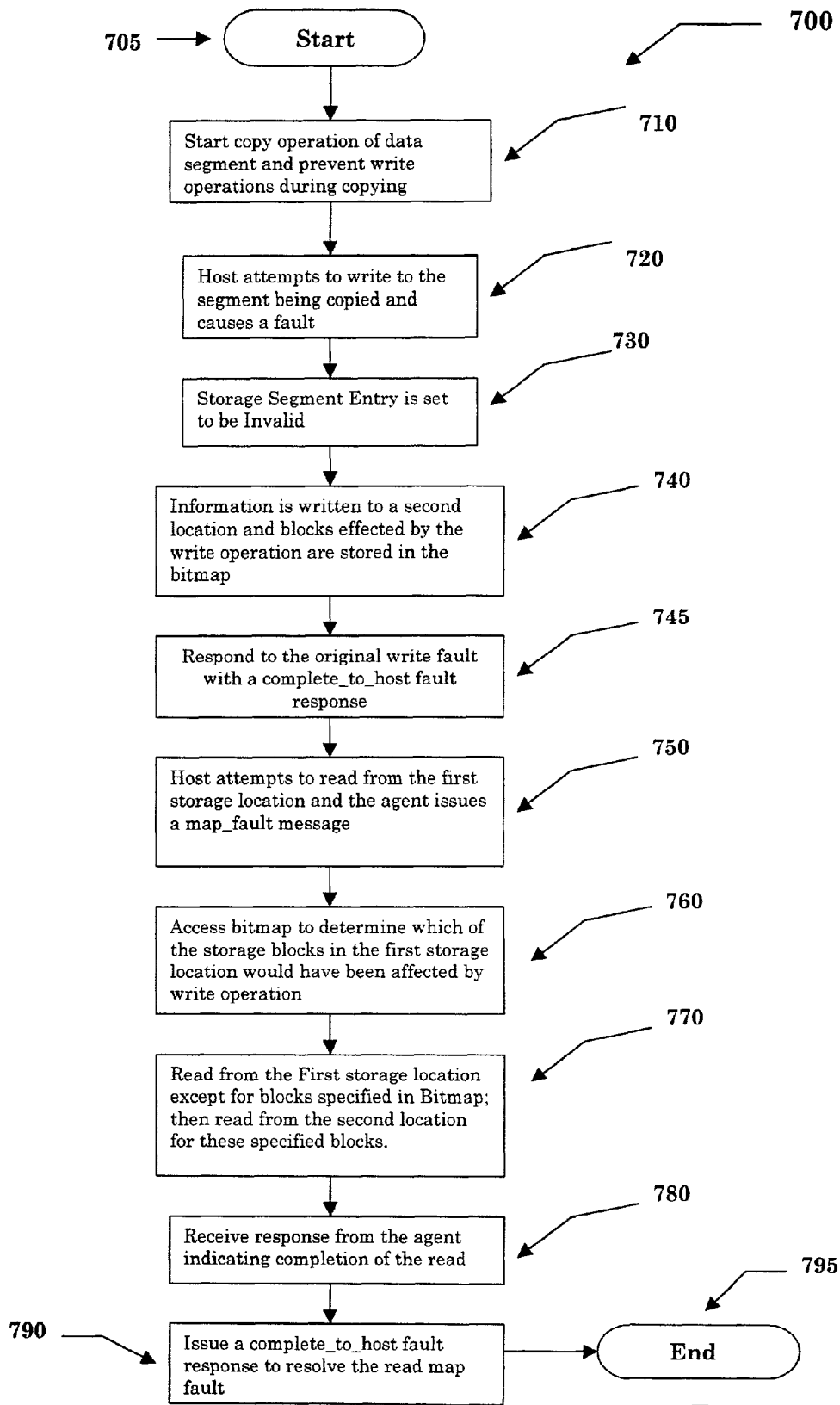

Although data may be read during the copying of a segment, data may not be written to the segment. The basic process 700 of writing to a segment during copying is illustrated in FIG. 6B. Again, the copying begins before the I/O operation, step 710. Specifically, the controller 120 issues the set_entry_state command to activate the Nw state 250 for the subject entry 210 for all effected agents 110. The controller 120 setting of the Nw state 250 in the table entry 210 also activates the blocking flag. The agents 110 receive the set_entry_state command to set Nw state 250 and respond to the command. The controller 120 receives the set_entry_state responses, indicating that there are no outstanding writes to the segment, and begins the segment copy.

If a host then attempts to write to the virtual disk segment, the Nw state causes a write fault, step 720, in which the agent 110 issues a fault message that includes the bitmap 225 designating the blocks in segment 220 that are to be changed. The controller 120 coordinates with the ongoing copy operation to insure that the copy operation is not currently writing to these same blocks designated by bitmap 225. The controller 120 then issues the set_entry_state command to activate the invalid state 240 for the table entry 210 on all agents 110 for all virtual disks 150 that map to this shared segment, step 730. It does so because the original storage container location 230 no longer contains a useable version of the data after the write operation to the alternate storage container location 235. Next, the controller 120 issues the do_write command to the agent 110, and the agent 110 then writes to the alternate storage container, step 740. The agent 110 issues a response to the controller 120 indicating completion of the do_write operation. After the controller 120 receives the do_write response, the controller 120 responds to original write fault with the complete_to_host fault response, step 745.

At this point, the faulted write is complete and all agents 110 have the segment 230 set to the invalid state 240, preventing a reading of the particular segment 230. If a host attempts to read this segment 230, the agent 110 issues a map_fault message, step 750. The controller 120 receives the map fault message, looks up the fine-grained bitmap 225 for this segment 230, and issues the do_split_read command to specify the original and alternate segments, 230 and 235, step 760. The mapping agent 110 receives the do_split_read command and uses it to complete the read operation by retrieving each block from the segment locations 230 and 235 that contains the correct data, step 770. Upon completion of the do_split_read task, the agent 110 sends a response to the controller 120 to signal the completion of the read operation. After the controller 120 receives the do_split_read response, the controller issues the complete_to_host fault response to resolve the read map fault, step 790. The segment write operation concludes in step 745.

While implementations of the system 100 for various I/O operations were described in reference to the forward delta process of FIG. 4, it should be appreciated that the system 100 could equally be applied to the I/O operations occurring with the following reverse delta process of FIGS. 5A and 5B. However, in the case of the reverse delta process, the do_write and the do_split_read commands occur at the original data segment and not at the newly created data segment.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A virtual storage system for mapping virtual storage segments of differing sizes to storage locations, comprising:
    an agent coupled to a host, the agent having volatile memory for storing a first table, the table having entries to map the virtual storage segments to the storage locations; and
    a controller coupled to the agent, the controller having non-volatile memory for storing a second table, the controller intermittently causing contents of the first table to be replaced by contents of the second table,
    whereby during an input/output (I/O) operation, the host accesses one of the entries in the first table to determine one of the storage locations.

2. The system of claim 1, wherein the second table identifies an alternate storage location within the storage locations.

3. The system of claim 2, wherein the second table further includes a bitmap having entries that correspond to blocks of data stored within the alternate storage location.

4. The system of claim 1, further comprising an alternate storage container comprising alternate storage locations of the storage location correlating to the virtual storage segments.

5. The system of claim 4, wherein an I/O operation accesses information on both the storage location and the alternative storage location.

6. The system of claim 5 wherein a bitmap designates blocks at the alternative storage location to use for the I/O operation.

7. A system for mapping a virtual disk segment to a storage location within a storage device, such that a host queries said system to determine said storage location for input/output operations, said system comprising:
    a first table having a first table entry mapping the virtual disk segment to the storage location;
    a second table having a second table entry corresponding to said storage location and to an alternate storage location, and block bitmap information identifying blocks of data having differing sizes within the alternate storage location;
    a plurality of variables indicating states of an entry in the first table or the second table;
    an offset for the entry, wherein the offset includes a logic unit number identifier and a block identifier;
    a first memory to store the first table; and
    a second memory to store the second table.

8. The system of claim 7, wherein said first memory is a volatile memory.

9. The system of claim 7, wherein said second memory is a non-volatile memory.

10. The system of claim 7, wherein the states include a no-write state.

11. The system of claim 7, wherein the states include an error state.

12. A method for performing an input/output operation on a virtual storage segment defined by a first table that maps a storage segment to a first storage location, the method comprising:
    turning off input/output operations at the first storage location;
    identifying portions of the virtual storage segment to be effected during a write operation;
    storing a record of the identified portions at a second table and not at the first table; and
    writing to a second storage location, whereby the writing operation occurs at portions of the second storage location associated with the identified portions.

13. The method of claim 12, wherein the turning off step includes activating an invalid state.

14. The method of claim 12, wherein a subsequent read operation for the virtual segment occur at portions of the first storage location not included in the identified portions and the portions of the second storage location associated with the identified portions.

15. The method of claim 14, wherein the first table is stored by an agent and during the read operation, the record of the identified portions is sent to the agent.

16. The method of claim 15, wherein the mapping between the virtual storage segment and first storage location is contained in numerous first tables, each of the first table stored by a different agent.

* * * * *